United States Patent
McCarthy et al.

(10) Patent No.: US 9,043,781 B2
(45) Date of Patent: May 26, 2015

(54) ALGORITHM FOR AUTOMATED ENTERPRISE DEPLOYMENTS

(75) Inventors: Edward McCarthy, Isaacs (AU); Barry Charles Searle, Mississauga (CA); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1511 days.

(21) Appl. No.: 11/003,902

(22) Filed: Dec. 3, 2004

(65) Prior Publication Data

US 2006/0123040 A1 Jun. 8, 2006

(51) Int. Cl.
G06F 9/445 (2006.01)

(52) U.S. Cl.
CPC ... G06F 8/61 (2013.01); G06F 8/60 (2013.01)

(58) Field of Classification Search
USPC ......... 717/168, 169, 170, 171, 172, 173, 174, 717/175, 176, 177, 178
See application file for complete search history.

(56) References Cited

U.S. PATENT DOCUMENTS

| | | | | |
|---|---|---|---|---|
| 6,393,605 | B1 * | 5/2002 | Loomans | 717/121 |
| 6,684,387 | B1 * | 1/2004 | Acker et al. | 717/126 |
| 6,779,177 | B1 | 8/2004 | Bahrs et al. | 717/173 |
| 6,986,135 | B2 * | 1/2006 | Leathers et al. | 717/177 |
| 7,069,553 | B2 * | 6/2006 | Narayanaswamy et al. | 717/173 |
| 7,127,713 | B2 * | 10/2006 | Davis et al. | 717/177 |
| 7,134,122 | B1 * | 11/2006 | Sero et al. | 717/177 |
| 7,165,249 | B2 * | 1/2007 | Potter et al. | 717/174 |
| 7,559,059 | B2 * | 7/2009 | Renaud | 717/174 |
| 7,797,697 | B2 * | 9/2010 | Woollen et al. | 717/170 |
| 7,856,631 | B2 * | 12/2010 | Brodkorb et al. | 717/177 |
| 7,895,591 | B2 * | 2/2011 | Spears | 717/168 |
| 2002/0087693 | A1 * | 7/2002 | Marshall et al. | 709/226 |
| 2003/0046682 | A1 | 3/2003 | Crespo et al. | 717/178 |
| 2003/0051236 | A1 * | 3/2003 | Pace et al. | 717/177 |
| 2003/0061247 | A1 * | 3/2003 | Renaud | 707/205 |
| 2003/0154239 | A1 * | 8/2003 | Davis et al. | 709/201 |
| 2003/0163807 | A1 * | 8/2003 | Drake et al. | 717/174 |
| 2003/0182656 | A1 * | 9/2003 | Leathers et al. | 717/177 |
| 2003/0212990 | A1 * | 11/2003 | Brodkorb et al. | 717/174 |
| 2004/0003266 | A1 * | 1/2004 | Moshir et al. | 713/191 |
| 2004/0015859 | A1 * | 1/2004 | Potter et al. | 717/120 |

(Continued)

OTHER PUBLICATIONS

Hazra, Tushar K. "Building enterprise portals: principles to practice." Software Engineering, 2002. ICSE 2002. Proceedings of the 24rd International Conference on. IEEE, 2002.*

(Continued)

*Primary Examiner* — Matthew Brophy
(74) *Attorney, Agent, or Firm* — Steven M. Greenberg, Esq.; CRGO Law

(57) ABSTRACT

A method of automating the deployment of a number of enterprise applications on one or more computer data processing systems. Each enterprise application or update is stored in a dynamic distribution directory and is provided with identifying indicia, such as stage information, target information, and settings information. When automated enterprise deployment is invoked, computer instructions in a computer readable medium provide for initializing deployment, performing deployment, and finalizing deployment of the enterprise applications or updates.

12 Claims, 12 Drawing Sheets

(56) References Cited

U.S. PATENT DOCUMENTS

| | | | |
|---|---|---|---|
| 2004/0225677 A1 | 11/2004 | Rangadass | 707/102 |
| 2005/0044531 A1* | 2/2005 | Chawla et al. | 717/122 |
| 2005/0160104 A1* | 7/2005 | Meera et al. | 707/100 |
| 2005/0177628 A1* | 8/2005 | Victoria et al. | 709/220 |
| 2005/0267918 A1* | 12/2005 | Gatev et al. | 707/203 |
| 2005/0289536 A1* | 12/2005 | Nayak et al. | 717/174 |
| 2005/0289538 A1* | 12/2005 | Black-Ziegelbein et al. | 717/177 |
| 2006/0005162 A1* | 1/2006 | Tseng et al. | 717/107 |
| 2006/0101462 A1* | 5/2006 | Spears | 717/177 |
| 2006/0123018 A1* | 6/2006 | Ashok et al. | 707/100 |

OTHER PUBLICATIONS

Coupaye, Thierry, and Jacky Estublier. "Foundations of enterprise software deployment." Software Maintenance and Reengineering, 2000. Proceedings of the Fourth European. IEEE, 2000.*

Fleury, Marc, and Francisco Reverbel. "The JBoss extensible server." Proceedings of the ACM/IFIP/USENIX 2003 International Conference on Middleware. Springer-Verlag New York, Inc., 2003.*

Ashok et al., Algorithm for Maximizing Application Availability During Automated Enterprise Deployments.

* cited by examiner

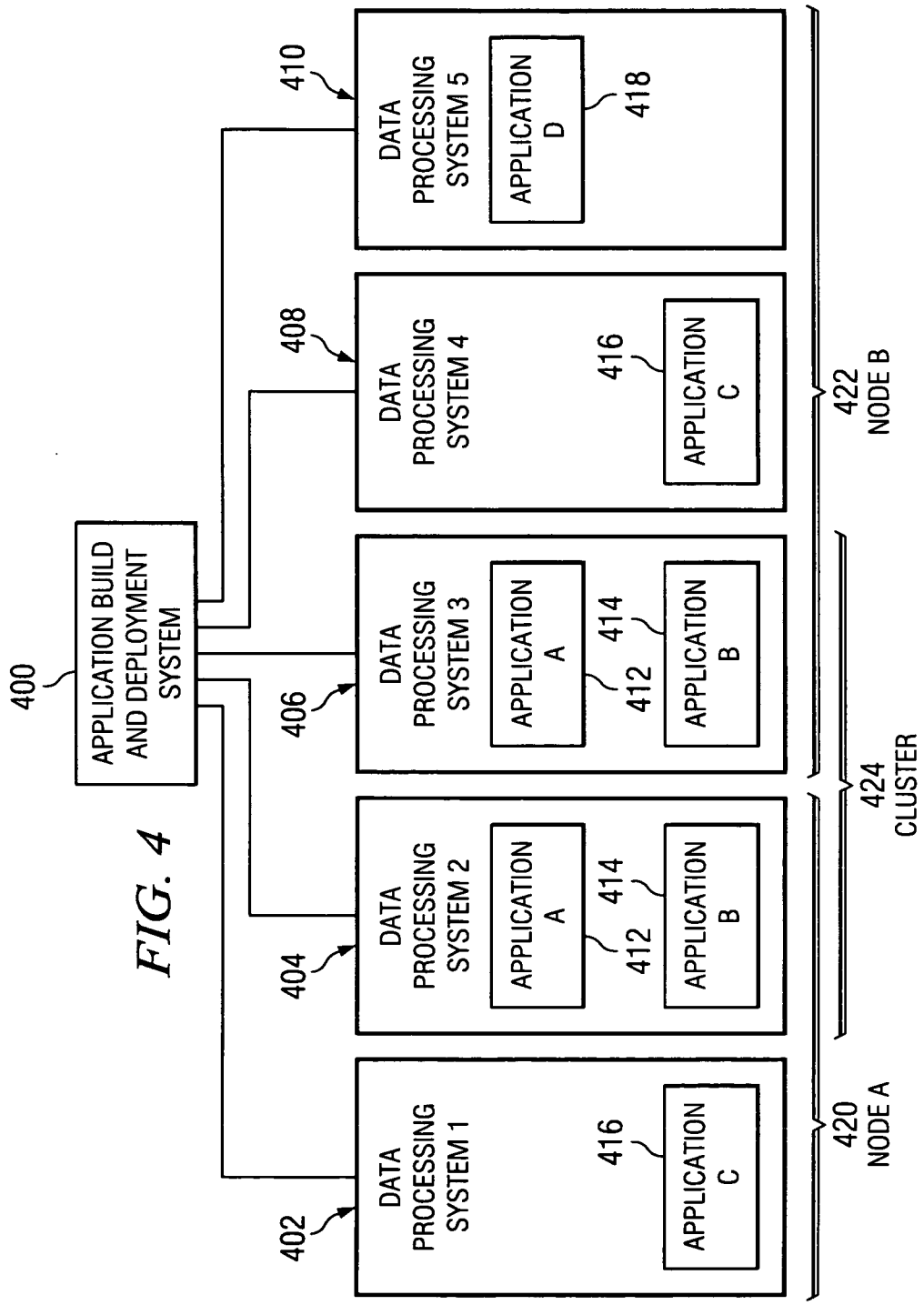

FIG. 7A

```
# multiple: nodeserver=nodeName, serverName
# multiple: cluster=clusterName
node server=bcsearle, server1
cluster=bcsearleCluster multiple: testURL=URL
multiple: testResult=resultString
testURL =
http://bcsearle:9081/AdderWAR/AdderTest.jsp
testResponse=Java adder (3,4)=7
testURL =
http://bcsearle:9085/AdderWAR/AdderTest.jsp
testResponse=EJBsessionbean adder (5,6)=11
```

FIG. 7B

```
# Adder application EAR
ApplicationName=AdderEAR
startingWeight=9
warClassLoaderPolicy=SINGLE

# Adder webmodule WAR
ModuleName=AdderWAR.war
startingWeight=12121
classloaderMode=PARENT_LAST
```

FIG. 11F

```
##################################
ERROR: ERRORS during DEPLOYMENT:
ERROR: testApplication: FAILED RESPONSE:
url=http://searle:9086/ AdderWAR/AdderTest.jsp
missing=(INTENTIONAL ERROR) - WEBPAGE MISSING THIS RESPONSE
    ERROR: testApplication: FAILED CONNECT:
url=http://abcdef:9999/AdderWAR/AdderTest.jsp
    missing=(INTENTIONAL ERROR) - MISSING THIS SERVER:PORT
############################ automatedDeploy.jac1 DONE.
```

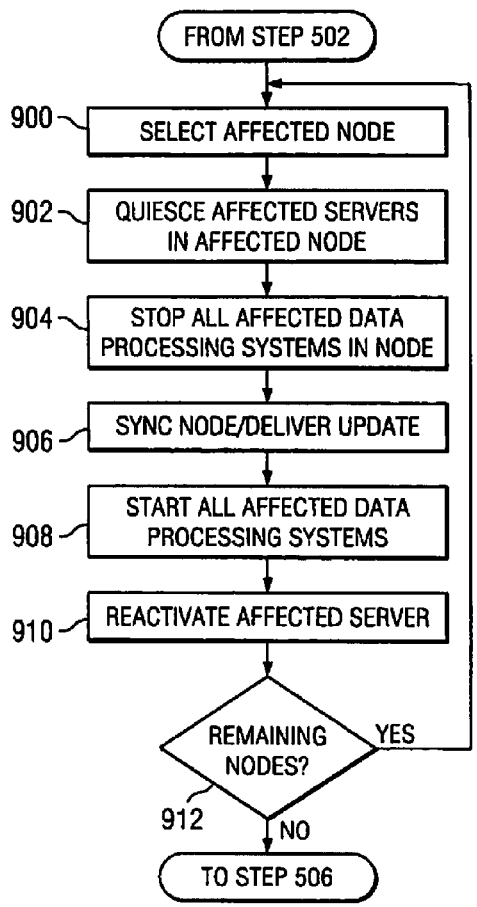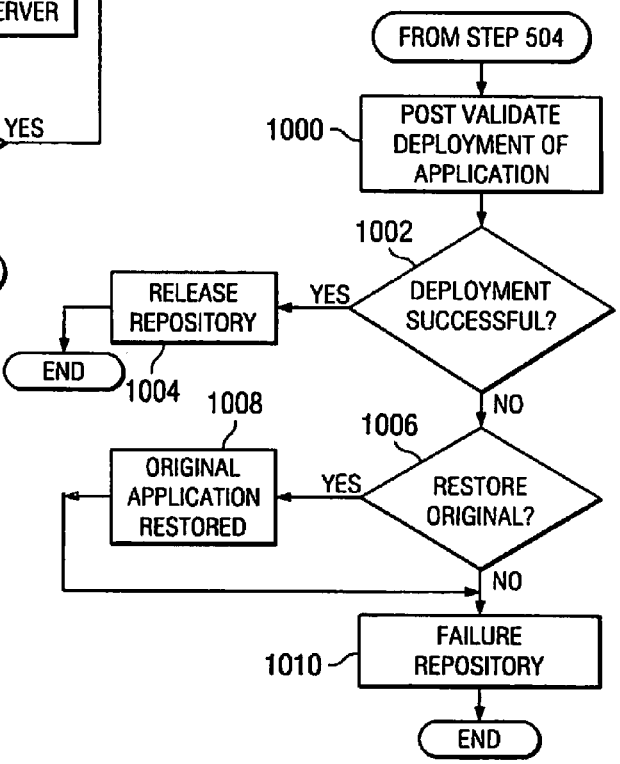

FIG. 11A running automatedDeploy.jacl- Version 1.1 automatedDeploy.jacl: WSADMIN: AdminType=DEPLOYMENT_MANAGER
automatedDeploy.jacl: WSADMIN: AdminVers=6.0
automatedDeploy.jacl: WSADMIN: AdminCell=bcsearle2Cell6
automatedDeploy.jacl: WSADMIN: AdminNode=bcsearle2CellManager6
automatedDeploy.jacl: WSADMIN: AdminConn=SOAP
automatedDeploy.jacl: WSADMIN: AdminHost=bcsearle2
automatedDeploy.jacl: WSADMIN: AdminSevr=dmgr
automatedDeploy.jacl: WSADMIN: AdminPort=8887
automatedDeploy.jacl: INPUTS: action=update
autornatedDeploy.jacl: INPUTS: depType=-pilot
automatedDeploy.jacl: INPUTS:
distDir=F:/wsadv511/wstools/eclipse/plugins/com.ibm.etools.j2ee.ant_5.1.1/Example/
AdderDeploy/dist
automatedDeploy.jacl: INPUTS: wasRoot=F:/WAS60/AppSvr/profiles/ND6
automatedDeploy.jacl: INPUTS: failOnError=false
automatedDeploy.jacl: invoking deploy update -pilot false
F:/wsadv511/wstools/eclipse/plugins/com.ibm.etools.j2ee.ant_5.1.1/Example/AdderDeploy/dist
F:/WAS60/AppSvr/profiles/ND6
readDistributionDirectory:
F:/wsadv511/wstools/eclipse/plugins/com.ibm.etools.j2ee.ant_5.1.1/Example/AdderDeploy/dist
...
installOrUpdate: Deployment
ears=F:/wsadv511/wstools/eclipse/plugins/com.ibm.etools.j2ee.ant_5.1.1/Example/AdderDeploy/
dist/AdderEAR.ear
parseApplicationNames:
earPath=F:/wsadv511/wstools/eclipse/plugins/com.ibm.etools.j2ee.ant_5.1.1/
Example/AdderDeploy/dist/AdderEAR.ear
parseApplicationNames: appName=AdderEAR
installOrUpdate: Deployment appNames=AdderEAR
PreValidateApplicationTargetsAndSettingsFilesExist DONE. appNames=AdderEAR depType=-pilot
PreValidateApplicationsExist OK appName=AdderEAR
readTargetsFile:
targetFile=F:/wsadv511/wstools/eclipse/plugins/com.ibm.etools.j2ce.ant_5.1.1/Example/
AdderDeploy/dist/adderEAR-pilot.targets
readTargetsFile: node=bcscarle2NodeND6 server=server1
readTargetsFile: node=searleNodeND6 server=server1
readTargetsFile: cluster=bcscarle2Cluster6

FIG. 11B calculateAffectedNodes: RESULT: uniqueNodesContainedServers=
{bcsearle2NodeND6 {server1 server61}} {searleNodeND6 {server 1 server62} }

--- calculateAffectedNodes DONE.

---

PreValidateNodesAndServersAndClusters DONE.

--- saveAndDisableAutosync of affectedNodes begin ...
saveAndDisableAutosync: nodeName=bcsearle2NodeND6 syncEnabled=true
synchOnServerStartup=true
saveAndDisableAutosync: temporarily setting AutoSyncEnabled FALSE for node=bcsearle2NodeND6
saveAndDisableAutosync: temporarily setting SynchOnServerStartup FALSE for node=bcsearle2NodeND6
saveAndDisableAutosync: nodeName=searleNodeND6 syncEnabled=true
synchOnServerStartup=true
saveAndDisableAutosync: temporarily setting AutoSyncEnabled FALSE for node=searleNodeND6
saveAndDisableAutosync: temporarily setting SynchOnServerStartup FALSE for node=searleNodeND6
configSave: ...

--- saveAndDisableAutosync of affectedNodes DONE.

--- installOrUpdate: RESULT: nodesAutosyncs={bcsearle2NodeND6 true true} {searleNodeND6 true true}
configSave: ...
installAndConfigureApps: appNames=AdderEAR ...
ListApplications:
  AdderEAR
  camaroEAR
  cancunEAR
  cancun_ear
  cancun_earname
  cancun_war_name
  newcancun_war
installAndConfigureApps: appName=AdderEAR
validateEAR: FUTURE: installed EAR-FILE validation

FIG. 11C processSettingsFile:
settingsFileName=F:/wsadv511/wstools/eclipse/plugins/com.ibm.etools.j2ee.ant_5.1.1/Example/AdderDeploy/dist/ AdderEAR-pilot.settings.
setAttribute: Type=Application Name=AdderEAR Attribute=warClassLoaderPolicy Value=SINGLE
showAttribute: AdderEAR warClassLoaderPolicy=SINGLE
setAttribute: Type=WebModule Name=AdderWAR.war Attribute=classloaderMode Value=PARENT_LAST
showAttribute: AdderWAR.war classloaderMode=PARENT_LAST
setModuleMappings: targets=
WebSphere:cell=bcsearle2Cell6,cluster=bcsearle2Cluster6
+WebSphere:cell=bcsearle2Cell6,node=bcsearle2NodeND6,server=server1
+WebSphere:cell=bcsearle2Cell6,node=searleNodeND6,server=server1
setModuleMappings: mapping="Ejb SessionBean" AdderEJB.jar,META-INF/ejb-jar.xml
WebSphere:cell=bcsearle2Cell6,cluster=bcsearle2Cluster6
+WebSphere:cell=bcsearle2Cell6,node=bcsearle2NodeND6,server=server1
+WebSphere:cell=bcsearle2Cell6,node=searleNodeND6,server=server1
setModuleMappings: mapping="Adder WAR" AdderWAR.war, WEB-INF/web.xml
WebSphere:cell=bcsearle2Cell6,cluster=bcsearle2Cluster6
+WebSphere:cell=bcsearle2Cell6,node=bcsearle2NodeND6,server=server1
+WebSphere:cell=bcsearle2Cell6,node=searleNodeND6,server=server1
validateApplication AdderEAR ...
ListApplications:
  AdderEAR
  camaroEAR
  cancunEAR
  cancun_ear
  cancun_earname
  cancun_war_name
  newcancun_war

--- installAndConfigureApps DONE. (ready to distribute to nodes/servers)

--- configSave: ...
installOrUpdate: stopSyncStart of affected nodes ...
stopSyncStart: nodename=bcsearle2NodeND6 containedServernames=server1 server61 ...
stopSyncStart: FUTURE: plugin-cfg.xml QUIESCE node=bcsearleNodeND6 servers=server1 server61
stopNDServer: nodeName=bcsearle2NodeND6 serverName=server1 state=STARTED
WASX7337I: Invoked stop for server "server 1" Waiting for stop completion.

FIG. 11D checkServerStopped: bcsearle2NodeND6 server1 actualState=STOPPED
desiredState=STOPPED
stopNDServer: nodeName=bcsearle2NodeND6 serverName=server61 state=STARTED
WASX7337I: Invoked stop for server "server61" Waiting for stop completion.
checkServerStopped: bcsearle2NodeND6 server61 actualState=STOPPED
desiredState=STOPPED
syncNDNode: ReSync of ND Node=bcsearle2NodeND6 (actual application distribution to Server(s) ) ...
syncNDNode: bcsearle2NodeND6 invoked sync=true DONE.
syncNDNode: FUTURE: check for nodeSync EAR expansion complete (for now just delay 10 secs)
startNDServer: nodeName=bcsearle2NodeND6 serverName=server1 ...
checkServerStarted: nodeName=bcsearle2NodeND6 serverName=server1 ...
checkServerStarted: bcsearle2NodeND6 server1 state=STARTED
startNDServer: NodeName=bcsearle2NodeND6 serverName=server61 ...
checkServerStarted: nodeName=bcsearle2NodeND6 serverName=server61 ...
checkServerStarted: bcsearle2NodeND6 server61 state=STARTED
stopSyncStart: FUTURE: plugin-cfg.xml RE-ACTIVATE node=bcsearle2NodeND6 servers=server1 server61
stopSyncStart: DONE. (nodeName=bcsearle2NodeND6)
stopSyncStart: nodename=searleNodeND6 containedServernames=server1 server62 ...
stopSyncStart: FUTURE: plugin-cfg.xml QUIESCE node=searleNodeND6 servers=server1 server62
stopNDServer: nodeName=searleNodeND6 serverName=server1 state=STARTED
WASX7337I: Invoked stop for server "server1" Waiting for stop completion.
checkServerStopped: searleNodeND6 server1 actualState=STOPPED desiredState=STOPPED
stopNDServer: nodeName=searleNodeND6 serverName=server62 state=STARTED
WASX7337I: Invoked stop for server "server62" Waiting for stop completion.
checkServerStopped: searleNodeND6 server62 actualState=STOPPED desiredState=STOPPED
syncNDNode: ReSync of ND Node=searleNodeND6 (actual application distribution to Server(s) ) ...
syncNDNode: searleNodeND6 invoked sync=true DONE.
syncNDNode: FUTURE: check for nodeSync EAR expansion complete (for now just delay 10 secs)
startNDServer: nodeName=searleNodeND6 serverName=server1 ...
checkServerStarted: nodeName=searleNodeND6 serverName=server1 ...
checkServerStarted: searleNodeND6 server1 state=STARTED
startNDServer: nodeName=searleNodeND6 serverName=server62 ...
checkServerStarted: NodeName=searleNodeND6 serverName=server62 ...
checkServerStarted: searleNodeND6 server62 state=STARTED

FIG. 11E stopSyncStart: FUTURE: plugin-cfg.xml RE-ACTIVATE node=searleNodeND6
servers=server1 server62
stopSyncStart: DONE. (nodeName=searleNodeND6)
installOrUpdate: stopSyncStart of affected nodes DONE.
restoreAutosync of affectedNodes begin ...
restoreAutosync: nodeName=bcsearle2NodeND6 syncEnabled=true synchOnServerStartup=true
saveAndDisableAutosync: restoring AutoSyncEnabled TRUE for node=bcsearle2NodeND6
saveAndDisableAutosync: restoring SynchOnServerStartup TRUE for node=bcsearle2NodeND6
restoreAutosync: nodeName=searleNodeND6 syncEnabled=true synchOnServerStartup=true
saveAndDisableAutosync: restoring AutoSyncEnabled TRUE for node=searleNodeND6
saveAndDisableAutosync: restoring SynchOnServerStartup TRUE for node=searleNodeND6
configSave: ...

--- restoreAutosync of affectedNodes DONE.

--- configSave: ...
test Application: URLs and Responses begin ...
testApplication: PASSED: url=http://bcsearle2:9085/AdderWAR/AdderTest.jsp
contained=Java adder(3,4)=7
testApplication: PASSED: url=http://searle:9085/AdderWAR/AdderTest.jsp
contained=EJBsessionbean adder(5,6)= 11
testApplication: PASSED: url=http://bcsearle2:9086/AdderWAR/AdderTest.jsp
contained=Java adder(3,4)= 7
testApplication: PASSED: url=http://searle:9086/AdderWAR/AdderTest.jsp
contained=EJBsessionbean adder(5,6)=11

---

ERROR: testApplication: FAILED RESPONSE:
url=http://searle:9086/AdderWAR/AdderTest.jsp
   missing=(INTENTIONAL ERROR) - WEBPAGE MISSING THIS RESPONSE

--- readWebPage: socketerror=1 for server=abcdef port=9999

---

ERROR: testApplication: FAILED CONNECT:
url=http://abcdef:9999/ AdderWAR/AdderTest.jsp
   missing=(INTENTIONAL ERROR) - MISSING THIS SERVER:PORT

--- installOrUpdate: DONE.

ALGORITHM FOR AUTOMATED ENTERPRISE DEPLOYMENTS

CROSS REFERENCE TO RELATED APPLICATION

The present invention is related to the following application entitled Algorithm for Maximizing Application Availability During Automated Enterprise Deployments, Ser. No. 11/003,593, filed on Dec. 3, 2004.

BACKGROUND OF THE INVENTION

1. Technical Field

The present invention is related generally to a data processing system and in particular to a method and apparatus for processing data. Still more particularly, the present invention relates to a method, apparatus, and computer program product for maximizing application availability while automatically deploying enterprise applications or updates in complex data processing environments.

2. Description of Related Art

Modern data processing environments can be extremely complex. A data processing environment may have a vast number of data processing systems connected to each other in a web of physical groupings known as nodes and logical groupings known as clusters. A node is a control mechanism for one or more servers on a machine. A cluster logically deals with multiple similar servers on different machines. Clusters can coexist with other non-cluster servers on a machine and may contain all of the same applications.

Due to the nature of the organization of inter-dependent applications throughout the set of data processing systems, affecting one data processing system in a node or cluster may affect other applications on other data processing systems in the data processing environment. If at least one copy of each application does not remain running somewhere in the data processing environment, then service may be denied and an availability failure may occur. Moreover, one running copy of every application may not be sufficient to maintain service. Multiple running copies of software may be required to achieve acceptable throughput and response service levels.

The complexity of modern data processing environments makes deploying new enterprise applications (EARs), or other applications, onto data processing systems difficult. The problem is especially complex if updated enterprise applications are deployed. If even one data processing system requires an enterprise application update to be deployed, then many other data processing systems can be affected.

Automated programs for deploying enterprise applications that are available today require voluminous code. Such programs are hard-coded to particular sets of enterprise applications and particular environments. Such unique code is not transferable to other organizations, is not supportable, and is not flexible enough to adapt to new applications or new environments.

BRIEF SUMMARY OF THE INVENTION

The present invention provides a method, apparatus, and computer program product for automating the deployment of a number of enterprise applications or enterprise application updates on one or more computer data processing systems operating in a data processing environment. Each enterprise application is stored in a dynamic distribution directory and is provided with identifying indicia, such as stage information, target information, and settings information. When automated enterprise deployment is invoked, computer instructions in a computer readable medium provide for initializing, performing, and finalizing deployment of the enterprise applications. During initialization, the stage, target, and settings information of each enterprise application in the dynamic distribution directory are read. A number of enterprise applications are selected to be deployed on target data processing systems. The targeted data processing systems and selected enterprise applications are pre-validated before deployment. During deployment, the enterprise applications are deployed to the target data processing systems. During the finalization of deployment, the deployment of each enterprise application is validated. Upon successful deployment, deployed enterprise applications are moved from a distribution directory into a released directory for audit purposes or for future rollback and recovery use.

BRIEF DESCRIPTION OF THE SEVERAL VIEWS OF THE DRAWINGS

FIG. 4 is a block diagram illustrating an environment in which the present invention may be implemented.

FIG. 7A shows an example of target information for use with a computer program, in accordance with an aspect of the present invention.

FIG. 7B shows an example of settings information for use with a computer program, in accordance with an aspect of the present invention.

FIG. 9 is a flowchart illustrating steps taken during the perform deployment step of FIG. 5, in accordance with an aspect of the present invention.

FIG. 10 is a flowchart illustrating the steps taken during the finalize deployment step of FIG. 5, in accordance with an aspect of the present invention.

FIGS. 11A through 11F show an example of the output logs for computer instructions for performing the method illustrated in FIG. 5, in accordance with an aspect of the present invention.

DETAILED DESCRIPTION OF THE INVENTION

Figure 1:
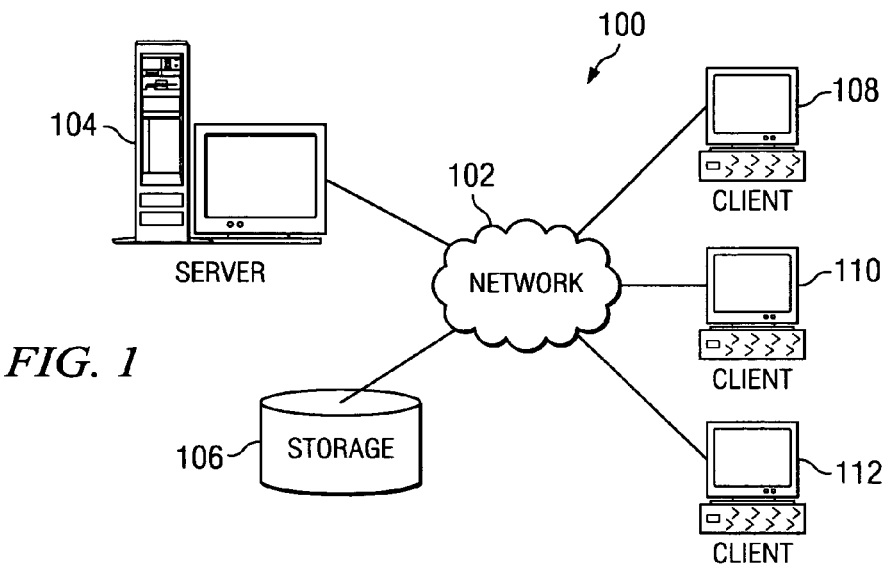
FIG. 1 is a pictorial representation of a network data processing system in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to the figures and in particular with reference to FIG. 1, a pictorial representation of a network data processing system in which the present invention may be implemented is depicted. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, running system images, and programs to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
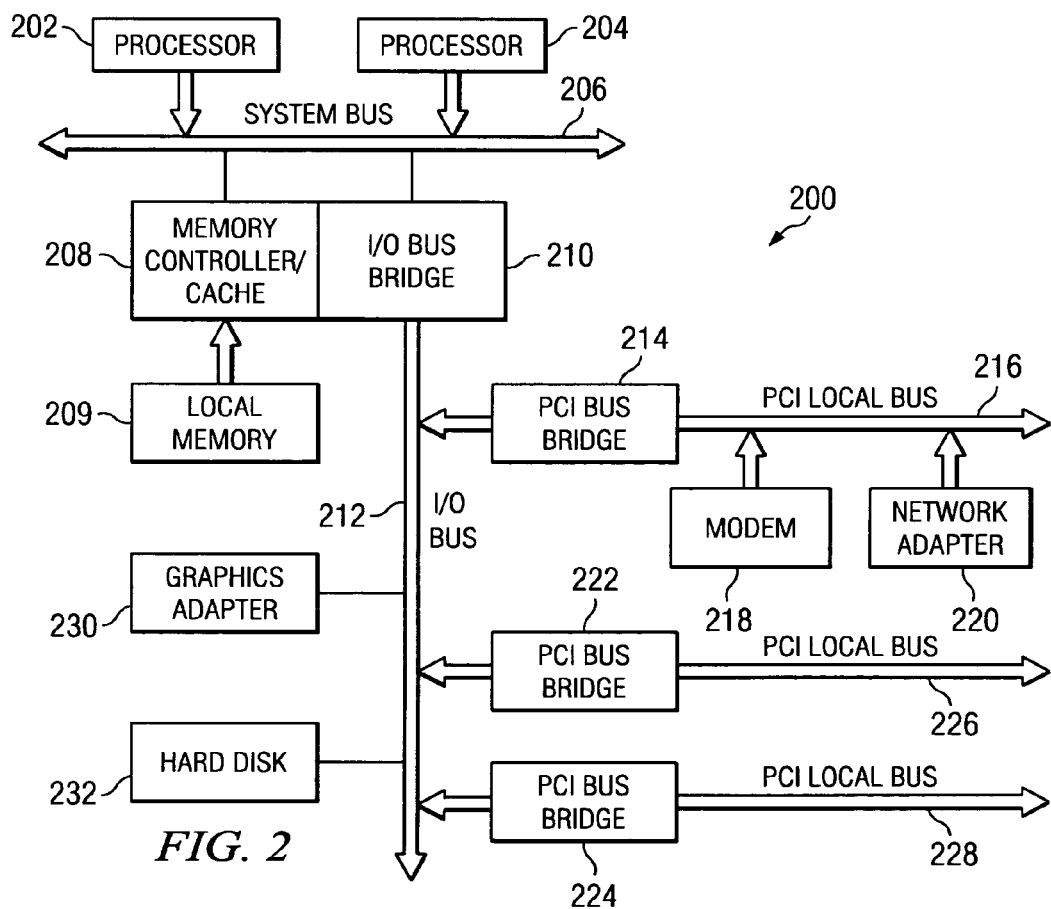
FIG. 2 is a block diagram of a data processing system that may be implemented as a server in accordance with an aspect of the present invention.

FIG. 2 is a block diagram of a data processing system that may be implemented as a server, such as server 104 of FIG. 1, in accordance with an aspect of the present invention. Data processing system 200 may be a symmetric multiprocessor (SMP) system including a number of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® computer system, running the Advanced Interactive Executive (AIX®)) operating system or LINUX operating system (IBM, eServer, pSeries and AIX are trademarks of International Business Machines Corporation in the United States, other countries, or both while Linux is a trademark of Linus Torvalds in the United States, other countries, or both).

Figure 3:
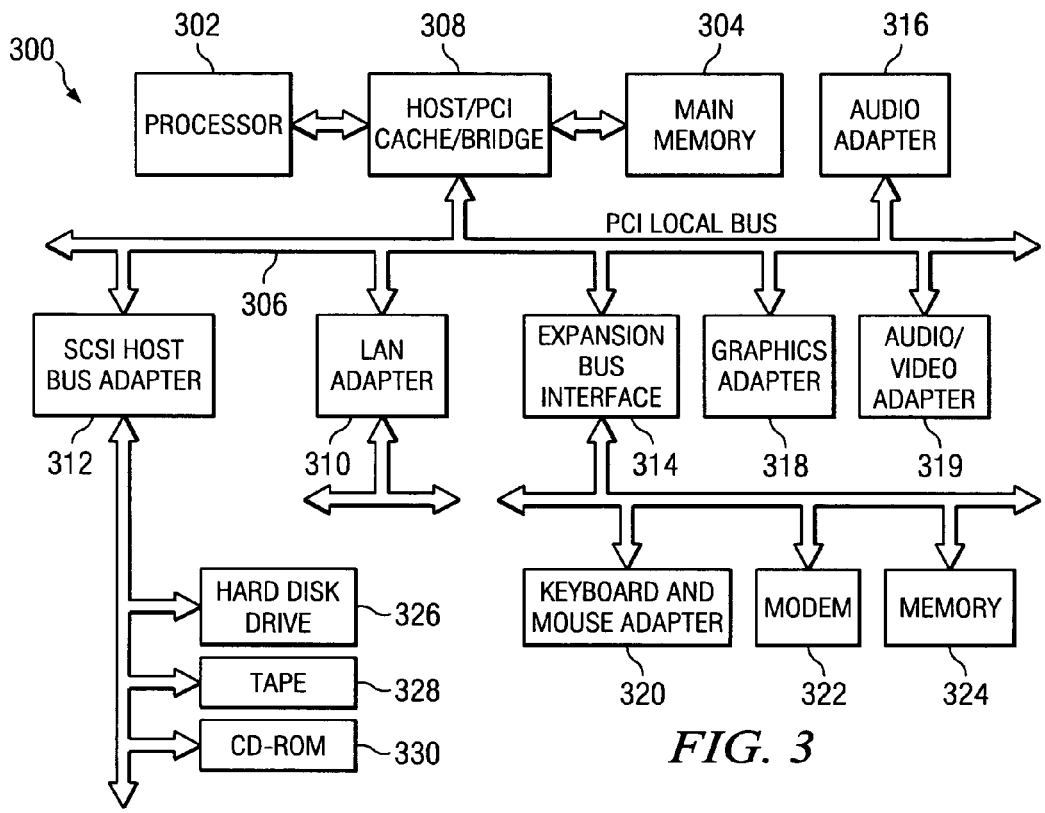
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Microsoft® Windows® XP (Microsoft and Windows are trademarks of Microsoft Corporation in the United States, other countries, or both). An object oriented programming system such as Java™ may run in conjunction with the operating system and provide calls to the operating system from Java programs or programs executing on data processing system 300 (Java is a trademark of Sun Microsystems, Inc. in the United States, other countries, or both). Instructions for the operating system, the object-oriented programming system, and programs or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In a complex data processing environment, many data processing systems are arranged into nodes and clusters, and each data processing system supports or runs a number of applications. These applications, and in particular enterprise applications, are installed and updated on the data processing systems and their application server programming systems. However, when an application is installed or updated, that application is not available for service unless that application is also replicated and running on other data processing systems. If one application is not available for service, then often other inter-dependent applications may also fail to provide service. It is very inefficient to disable many or all data processing systems to deploy applications or application updates. However, it is very difficult to update individual data processing systems without disabling many data processing systems in the environment, due to the complexity of the operating environment and due to inter-dependencies between all the enterprise applications.

The present invention provides a method, apparatus, and computer program product for automating the deployment of a number of enterprise applications or updates on one or more computer data processing systems in a data processing environment. In the illustrative examples, deploying an enterprise application means taking steps such as, for example, installing the enterprise application, updating an existing enterprise application, reconfiguring an existing enterprise application, or deleting an existing enterprise application. Each enterprise application is stored in a dynamic distribution directory and is provided with identifying indicia, such as stage information, target information, and settings information. When an automated enterprise deployment is invoked, computer instructions in a computer readable medium provide for initializing, performing, and finalizing deployment of the enterprise applications.

During initialization, a number of enterprise applications or updates are selected to be deployed on target data processing systems. Next, the stage, target, and settings information of each selected enterprise application are read. Thereafter, the targeted data processing systems are pre-validated for enterprise application deployment, and then the selected enterprise applications or updates are read and are installed into a distribution repository and have their configuration settings and targets set. During deployment, the enterprise applications are deployed to the target data processing systems. During the finalization of deployment, the deployment of each enterprise application is validated. Upon successful deployment, deployed enterprise applications are moved from the distribution directory into a released directory for audit purposes or for future rollback and recovery use. While the present invention is useful during the initial deployment of enterprise application, it is especially useful during the ongoing and highly repeated deployment of enterprise application updates.

FIG. 4 shows an illustrative environment wherein a deployment system 400 installs and maintains applications on five data processing systems, 402, 404, 406, 408, and 410 connected via a network, such as an intranet or the Internet. Each data processing system may be a build and deployment server on a server such as server 104 of FIG. 1, a client computer, such as clients 108, 110, and 112, or a stand-alone computer. Typically, the data processing environment is a collection of servers that do not use the server-client structure. The deployment system 400 need not be a separate data processing system, but may be one of the affected data processing systems, 402, 404, 406, 408, and 410. The deployment system may also be computer instructions contained in a computer readable medium for carrying out the deployment of enterprise applications. In addition, multiple deployment systems may be implemented.

In any case, each data processing system executes a number of applications. Data processing system 1 402 executes application C 416. Data processing system 2 404 executes application A 412 and application B 414. Data processing system 3 406 is a redundant logical cluster member on a different physical node which also executes applications A 412 and application B 414. Data processing system 4 executes redundant application C 416. Data processing system 4 is similar to data processing system 1, but these two systems have not been logically grouped together as a cluster. Data processing system 410 executes non-redundant application D 418. Data processing systems 402 and 404 are physically grouped into Node A 420. Data processing systems 406, 408, and 410 are physically grouped into Node B 422. Data processing systems 404 and 406 are logically grouped into cluster 424.

FIG. 4 shows four applications executed on five data processing systems physically grouped into two nodes. Two data processing systems are logically grouped into one cluster. However, actual data processing environments may contain hundreds or even thousands of data processing systems executing a vast array of applications. Similarly, the data processing systems may be grouped into a great number of nodes and clusters.

FIG. 4 illustrates that one application may be executed on data processing systems grouped in different nodes and clusters. For example, application A 412 runs on data processing systems 404, and 406, across node A 420 and node B 422, and within cluster 424. Because of the complexity of this arrangement, if an update to application A is to be simultaneously deployed to data processing systems 404 and 406, then all five data processing systems, 402, 404, 406, 408, and 410 may be affected if applications C 416 or D 418 depend on the affected application A 412.

In another example, if application A 412 is affected and first updated only on data processing system 404, then in order to quiesce work to application A 412 the entire data processing system 404 must be stopped prior to its application update. Thus, application B 414 will also be unavailable in data processing system 404, even if that application B 414 is not directly dependent on application A 412. Maintaining complete redundant copies of all applications within different clusters members helps to avoid such associated application failures. However, in many data processing environments, clusters might not be used or there may be one or more unique applications in certain cluster members. In addition, many enterprise systems may have a combination of non-clustered applications spread over different sets of nodes and servers due to a number of reasons, including security, corporate organization, or geographic location.

The problem can become exponentially more serious and difficult to solve in actual data processing environments. The problem becomes still more complex if applications are updated or maintained on a regular basis, especially if the applications are maintained on a daily basis, and especially if large arbitrary subsets of the applications are updated each time.

Figure 5:
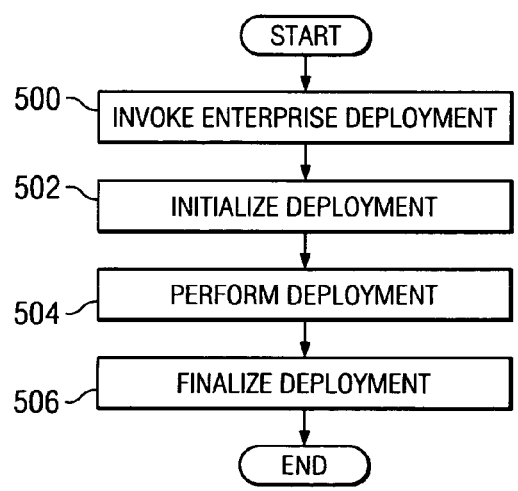
FIG. 5 is a flowchart illustrating the automatic deployment of enterprise applications in the operating environment of FIG. 4, in accordance with an aspect of the present invention.

FIG. 5 is a flowchart illustrating the automatic deployment of enterprise applications or updates in the operating environment of FIG. 4, in accordance with an aspect of the present invention. Although the process of deploying enterprise applications or updates is described in the context of deploying enterprise applications, the process may be used to deploy any application in a data processing environment. Furthermore, the term enterprise application may refer to both enterprise applications and updates for enterprise applications.

The process begins with a command to invoke the deployment of enterprise applications (step 500). The command to invoke deployment may come from input provided by a user, in which case the invocation is a manual invocation. The command to invoke deployment may come from input provided by an automatic process such as another computer program, in which case the invocation is an automatic invocation. In an illustrative embodiment, automatic invocation is performed on a regular basis, such as daily or weekly time periods. In this case, a program automatically invokes the deployment of enterprise applications once during each time period. However, a program may automatically invoke the deployment of enterprise applications based on other conditions, such as the failure of one or more applications, the failure of one or more data processing systems in the environment, the availability of new or updated applications, and the like.

Next, the deployment system, such as deployment system 400 of FIG. 4, initializes a set of enterprise applications to be deployed onto a set of data processing systems (step 502). During initialization, a subset of enterprise applications may be selected, based on their last updated time, identifying indicia, or other indicia, from the set of enterprise applications in the dynamic distribution directory. The deployment system then pre-validates the deployment of the subset of enterprise applications to ensure that the deployment of the subset of enterprise applications has an acceptable chance to succeed.

Next, a deployment system, such as deployment system 400 of FIG. 4, actually deploys the subset of enterprise applications or updates to the data processing systems, such as data processing systems 402, 404, 406, 408, and 410 of FIG. 4 (step 504). In an illustrative example, only a minimum number of data processing systems are deactivated while performing needed updates. An algorithm for deploying enterprise applications is shown in an application entitled, "Algorithm for Maximizing Application Availability During Automated Enterprise Deployments," U.S. application Ser. No. 11/003, 593, filed Dec. 3, 2004, which is hereby incorporated by reference. Deploying an enterprise application may involve installing a new enterprise application, updating a previous version of an installed enterprise application, reconfiguring or otherwise maintaining a previously installed enterprise application, or otherwise maintaining a previously installed enterprise application, or uninstalling a previously installed enterprise application.

After deploying the subset of enterprise applications to the data processing systems, the deployment system validates the deployment (step 506). The deployment of each enterprise application is verified. If the deployment was successful, then that application is moved from the distribution directory into the released directory. The application is also versioned with the current date and time. If the deployment was not successful, then that application is moved from the distribution directory into the failed directory.

Figure 6:
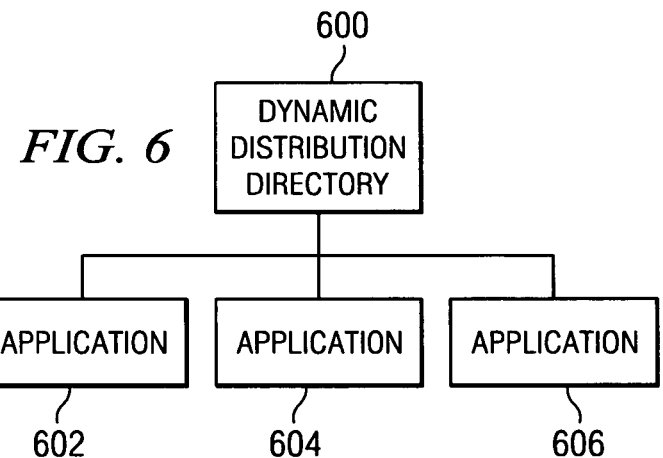
FIG. 6 is a block diagram illustrating the architecture of a dynamic distribution directory of enterprise applications, in accordance with an aspect of the present invention.
Figure 7:
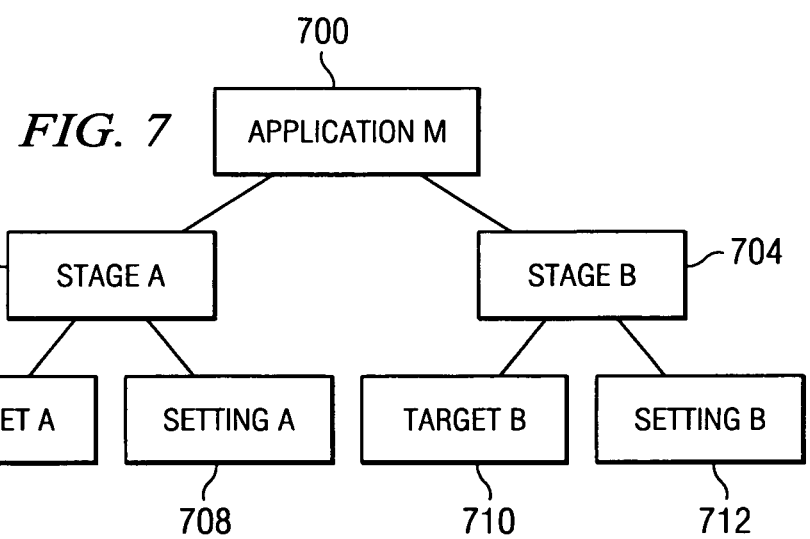
FIG. 7 is a block diagram illustrating the architecture of an enterprise application, in accordance with an aspect of the present invention.

FIG. 6 is a block diagram illustrating the architecture of dynamic distribution directory 600 of enterprise applications, such as enterprise applications 602, 604, and 606, in accordance with an aspect of the present invention. In order to perform an automatic update of enterprise applications, a deployment system, such as deployment system 400 in FIG. 4, identifies which enterprise applications are to be deployed. The deployment system identifies upon which data processing systems an enterprise application needs to be deployed. FIG. 6 and FIG. 7 show the architecture used to perform these functions in the illustrative examples.

All enterprise applications or updates, such as enterprise applications 602, 604, and 606, are grouped into a single dynamic distribution directory 600. Although FIG. 6 shows three enterprise applications or updates, the dynamic distribution directory may contain a vast plurality of enterprise applications or updates. The dynamic distribution directory is dynamic in the sense that different enterprise applications or updates are continually added to and removed from the dynamic distribution directory. In addition, additional dynamic distribution directories may be used by the deployment system. For example, one dynamic distribution directory may be provided for new enterprise applications and another dynamic distribution directory may be provided for updates to enterprise applications.

FIG. 7 is a block diagram illustrating the architecture of an enterprise application 700, in accordance with an aspect of the present invention. Enterprise application 700 may be any one of enterprise applications 602, 604, and 606 from FIG. 6.

An enterprise application is provided with one or more identifying indicia. In an illustrative embodiment, the identifying indicia are stage information, target information, and settings information.

Other indicia may be provided, such as resource information, configuration information, and prerequisite information. Resource information includes information regarding external resources which must be setup for an enterprise application on a targeted data processing system. Examples include Java Messaging System queues, JDBC data sources, Java Name and Directory Interface namespaces, security role mappings, security properties, and the like. Configuration information includes information regarding the manipulation of application server configurations. Examples include copying or exporting an existing application server, node or cluster; importing an application server, node, or cluster; renaming an application server, node, or cluster; deleting an application server, node or cluster; copying an existing enterprise application, and the like. Prerequisite information includes information regarding external programs, and optionally their version or service level, required for an enterprise application on a targeted data processing system. Examples include an operating system or the version or service level of an operating system, Java runtime version or service level, specific application server product and its version or service level, specific database product and its version or service level, and the like. These prerequisites can be verified as a precondition to deployment of an enterprise application. However, the prerequisites typically are not installed or modified by the deployment system.

In the illustrative examples, an enterprise application is identified with one or more groups of stage information, such as stage information A 702, or stage information B 704. Each group of stage information is further identified with a group of target information and a group of settings information. Thus, stage A 702, is identified with target information A 706, and settings information A 708. Similarly, stage B 704, is identified with target information B 710, and settings information B 712. However, the types of identifying indicia, stage, target, and setting, may be organized differently. Typically, stage indicia, such as pilot or production, are qualifiers to the other two indicia. Thus, for example, there may be a target-pilot and a target-production indicia, and also a settings-pilot and a settings-production indicia.

In these examples, stage information provides overarching information regarding where or when an enterprise application should be deployed. For example, stage information may specify that an enterprise application should be installed on certain operating systems, should be installed at a particular time, should only be deployed in relation to particular an application version, should be deployed to a particular subset of data processing systems within the set of data processing systems, should be deployed to a corporate department owning a subset of data processing systems, or should be deployed to a data processing systems in a physical location. Other types of stage information may be used.

In these examples, target information includes information regarding which data processing system to target within a set of data processing systems. Thus, target information may include information regarding which data processing systems, nodes, and clusters should be affected during deployment. It also contains information regarding the Universal Resource Locator (URL) web address for the application in those targeted systems, and their expected response, for use in post-deployment verification. FIG. 7A shows an example of target information for use with a computer program, in accordance with an aspect of the present invention.

In these examples, settings information includes information regarding how to configure an enterprise application on a targeted data processing system. Settings information may also include external resource settings, and application server configuration settings. Settings information may also include prerequisites based on other applications or versions of applications. Thus, settings information may depend on other applications or versions of other applications. FIG. 7B shows an example of settings information for use with a computer program, in accordance with an aspect of the present invention.

Stage information, target information, and settings information for each enterprise application may be organized differently. For example, stage information may not be used. In other examples, settings information may be dependent on target information. In addition, stage information, target information, and settings information for each enterprise application may be implemented in any suitable manner, including through Java property files, XML files, database records, or the like. However, the identifying indicia are organized and implemented, the deployment system is adapted to read the identifying indicia.

Figure 8:
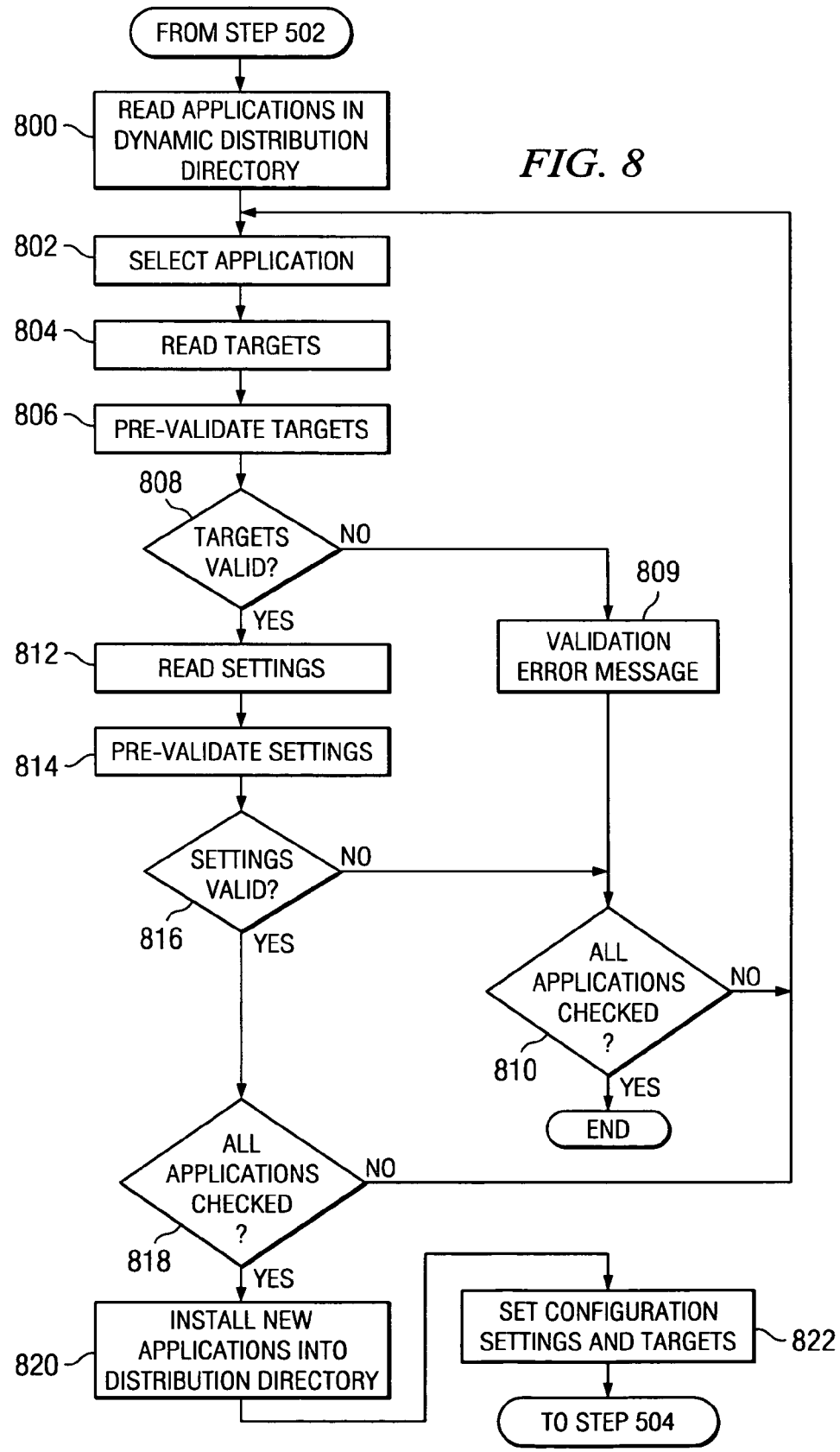
FIG. 8 is a flowchart illustrating the steps taken during the initialize deployment step of FIG. 5, in accordance with an aspect of the present invention.

FIG. 8 is a flowchart illustrating the steps taken during the initialize deployment in step 502 of FIG. 5, in accordance with an aspect of the present invention. After the enterprise deployment has been invoked, the deployment system reads each enterprise application in the dynamic distribution directory (step 800) and selects a subset or all enterprise applications for deployment to one or more target data processing systems (step 802). The deployment system selects the subset of enterprise applications to be deployed based on the identifying indicia in each enterprise application in the dynamic distribution directory.

Next, the deployment system reads the target information for the selected enterprise applications (step 804). The enterprise applications will be deployed on each targeted data processing system in the subset of all enterprise data processing systems. A target data processing system may be referred to as an affected data processing system because it executes or is intended to execute one or more or the selected applications. Executing an application on the data processing system affects the data processing system.

After identifying the target data processing systems, the deployment system pre-validates each enterprise application in relation to the target data processing systems (step 806). Pre-validating involves checking to see whether the deployment has an acceptable chance of success. In the example of FIG. 8, the deployment system determines whether the target data processing system is valid (step 808). If a particular target data processing system is not valid, such as when the data processing system does not exist, is down or fails to meet predetermined prerequisites, then the enterprise application will not be deployed and a validation error message can be issued (step 809). An enterprise application may be pre-validated by a variety of methods, including checking whether a target data processing system exists, validating the contents of the enterprise application, validating whether a deployment action, such as install, update, reconfigure, or uninstall may be performed, or whether a set of pre-defined prerequisites have been met.

Next, a determination is made whether all enterprise applications in the dynamic distribution directory have been checked (step 810). If all enterprise applications have been checked, then the process terminates as no more enterprise applications are to be deployed. If not all enterprise applications have been checked, then the deployment system returns to step 802 and selects the next enterprise application to deploy.

In another embodiment, if an enterprise application is to be deployed to multiple target data processing systems, and only some of the target data processing systems are invalid, then the process continues. In this case, the invalid target data processing systems are logged and then ignored and the process continues only for the valid target data processing systems.

Returning to step 808, if the target data processing system is valid, then the deployment system reads the settings information of the enterprise application (step 812). The deployment system may use the settings information to determine how the enterprise application will be configured on the target data processing system or systems.

Once the deployment system has read the settings information, the deployment system pre-validates all affected targets to check whether deployment has a chance of success (step 814). If the deployment has no chance of success, such as in the case where an update is to be applied but an older version is not installed, then a target data processing system is removed from the set of valid target data processing systems.

Next, a determination is made whether all selected enterprise applications in the dynamic distribution directory have been checked (step 818). If not, then the process returns to step 802 and enterprise applications to be deployed is selected. With reference again to step 818, if all enterprise applications in the dynamic distribution directory have been checked, then the process continues to deployment of the enterprise applications on all valid target data processing systems (step 504 in FIG. 5) upon setting the configuration settings and targets (step 822). At the end of the iterative process shown in FIG. 8, a selected subset of enterprise applications within the set of enterprise applications in the dynamic distribution directory is available for deployment in all valid data processing systems (step 820). The valid data processing systems are a subset of all data processing systems in an enterprise operating environment, where each enterprise application is to be deployed on each of its target data processing system in the subset.

FIG. 9 is a flowchart illustrating steps taken during the perform deployment step 504 of FIG. 5, in accordance with an aspect of the present invention. The process shown in FIG. 9 is described in more detail in an application entitled, "Algorithm for Maximizing Application Availability During Automated Enterprise Deployments," U.S. application Ser. No. 11/003,593, filed Dec. 3, 2004. In one embodiment, the deployment system performs a phased deployment according to the process shown in FIG. 9.

In an illustrative example, the deployment system first determines which data processing systems are affected by the deployment, as well as which nodes and clusters are affected by the deployment (step 900). A data processing system is affected if an enterprise application is to be deployed to the data processing system. A node is affected if one of the data processing systems in the node is affected. A cluster is affected if one of the data processing systems in the cluster is affected. For example, in the environment shown in FIG. 4, if application D 418 is to be deployed, then data processing system 410 is an affected data processing system. In this case, node B 422 is affected, but node A 420 and the cluster 424 are not affected.

Next, one affected node is selected and all its affected servers are optionally quiesced (step 902). Quiescing a server involves preventing a server from receiving more work, though quiesced data processing systems within the node remain temporarily active and can complete currently pending tasks. In the illustrative example, data processing system 410 is quiesced. In other processes, additional data processing systems or all data processing systems may be quiesced simultaneously.

Subsequently, all affected data processing systems in the node are stopped (step 904). In the illustrative example, data processing system 5 410 is stopped. Next, a sync node command is issued to the affected node B 422 so that all affected data processing systems in the node are synchronized and the updates are deployed to the affected data processing systems (step 906).

In addition, a configuration script may optionally be provided with the enterprise application to configure external resources required by the enterprise application at this time. The configuration script may perform configuration actions relating to the operating system, such as to copy files, create or clean directories, and to perform other functions related to other programs, such as creating message queuing tables or JDBC data sources. Such actions may extend beyond the affected data processing systems. Other activities and checks also may be performed on the affected data processing systems at this time.

In an illustrated example, an enterprise application updates application D 418 on data processing system 410. Enterprise applications or updates are deployed to all affected data processing system in a node simultaneously. In other processes, enterprise applications or updates are deployed to affected data processing systems sequentially.

After all enterprise applications have been deployed, the deployment system starts all affected data processing systems (step 908). Thereafter, the affected servers are reactivated, if they had been quiesced (step 910). Reactivating a server means that it will accept and process work requests for its applications.

After activating all servers on the affected node, the deployment system determines whether any other affected nodes remain (step 912). If affected nodes remain, then the process returns to step 900 in order to process the next affected node. If no affected nodes remain, then the process proceeds to finalize deployment (step 506 in FIG. 5). In the illustrated example, no affected nodes remain, so the process continues to finalize deployment.

In the illustrated example of FIG. 9, the entire process is performed automatically. However, the process may also allow manual confirmations. In this case, the deployment system will deploy an enterprise application to one data processing system, validate the deployment, and then pause. The deployment system then displays the result to the user. The deployment system then prompts the user for input as to whether to proceed with installing an enterprise application on the next server, to reverse the deployment, or to terminate the entire process. The deployment system repeats this process for every data processing system affected by an enterprise application deployment. Typically, the default response at each stage is to proceed with deployment of the next system. On the other hand, the default response may be to suspend deployment of enterprise applications or to stop the process altogether.

FIG. 10 is a flowchart illustrating the steps taken during the finalize deployment step 506 of FIG. 5, in accordance with an aspect of the present invention. After an enterprise application has been deployed to a data processing system, the deployment system post validates the deployment of the enterprise application (step 1000). The deployment system validates the deployment of an enterprise application by checking for whether the new or updated application responds appropriately to a stimulus. For example, the deployment system may provide input to a web-based application in order to check that the application responds and that the application transmits the appropriate contents.

Once a deployment has been validated, the deployment system determines whether the deployment was successful (step 1002). If successful, then the new or updated deployed enterprise applications are moved from the distribution directory into a released directory (step 1004), with the process terminating thereafter. Thus, the successful enterprise application or update may be audited, rolled-back, recovered, or otherwise tracked.

Returning to step 1002, if the deployment is not successful, then a determination is made as to whether it is possible to restore the original enterprise application (step 1006). If an original enterprise application exists and can be restored, then the deployment system restores the original enterprise application (step 1008). If the original enterprise application was restored in step 1008, then the failure is recorded in the failure repository (step 1010). Similarly, if an original enterprise application does not exist or cannot be restored, then the deployment system places the failed deployment into the failure repository (step 1010). The failure repository may contain the entire enterprise application, even though it failed to install or be updated. The failure repository may also contain a log containing data regarding when the deployment failed, any error codes, and the like. Thereafter, the deployment process terminates.

Alternatively, or in addition to, the process shown in FIG. 10, the deployment system may display the results of a deployment or may prompt a user for input. Thus, the user may manually verify that a deployment has been performed correctly and successfully. In any case, after a deployment has been completed, the newly deployed enterprise application is available for use.

FIGS. 11A through 11F show an example of the output logs for computer instructions for performing the method illustrated in FIG. 5, in accordance with an aspect of the present invention. The computer instruction logs on each page flow from the preceding page, beginning with the instruction logs shown on FIG. 11A and ending with the instruction logs shown on FIG. 11F. The computer instruction logs of FIGS. 11A through 11F show only one method of performing the steps shown in FIG. 5. The steps may be performed using different code and the steps may be expanded upon by supplying additional code.

Thus, the present invention provides a method, apparatus, and computer program product for automatically deploying enterprise applications or updates to one or more affected data processing systems operating in a complex data processing environment. When automated enterprise deployment is invoked, a deployment system searches available enterprise applications in a dynamic distribution directory and selects enterprise applications or updates to be deployed to target data processing systems. The deployment system then prepares for deployment of the applications by reading all identifying indicia and pre-validating enterprise applications to be deployed. After deploying the enterprise applications, the deployment system post-validates each deployment.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of deploying at least one enterprise application to one or more data processing systems, the method comprising a computer implementing the steps of:

storing a plurality of enterprise applications in a dynamic distribution directory with at least one data record containing identifying indicia about each enterprise application, the identifying indicia including stage information specifying a particular time when each enterprise application should be deployed, target information specifying which data processing systems should receive each enterprise application, which data processing systems should be affected during deployment, and also an expected response from a target data processing system, settings information specifying how to configure each enterprise application on the target data processing system, resource information specifying information regarding external resources that must be setup for each enterprise application on the target data processing system, configuration information specifying a manipulation of application server configurations, and prerequisite information specifying at least one of required external programs, a version of required external programs, and a service level of required external programs;

selecting a subset of the plurality of enterprise applications stored in the dynamic distribution directory for deployment based on at least two identifying indicia selected from the group consisting of stage information, target information, settings information, resource information, configuration information, and prerequisite information in each enterprise application of the subset of enterprise applications stored in the dynamic distribution directory, wherein at least one of the identifying indicia used in said selecting of the subset of enterprise applications is selected from a group consisting of resource information and prerequisite information in each enterprise application;

identifying target data processing systems by reading target information for each of the selected subset of enterprise applications;

pre-validating each target data processing system before deploying the subset of enterprise applications, wherein pre-validating involves checking whether deployment to each target data processing system has an acceptable chance of success;

reading the settings information for each of the selected subset of enterprise applications upon determining at least one of the target data processing systems has the acceptable chance of success;

installing the selected subset of enterprise applications into a distribution repository with updated target information based on the pre-validation and reading of the settings information; and deploying the selected subset of enterprise applications onto each of the corresponding pre-validated target data processing systems.

2. A non-transitory computer readable storage medium having computer readable program code embodied therein, the computer readable program code, when executed on a computer, causes the computer to perform:

storing a plurality of enterprise application in a dynamic distribution directory with at least one data record containing identifying indicia about each enterprise application, the identifying indicia including stage information specifying a particular time when each enterprise application should be deployed, target information specifying which data processing systems should receive each enterprise application, which data processing systems should be affected during deployment, and also an expected response from a target data processing system, settings information specifying how to configure each enterprise application on the target data processing system, resource information specifying information regarding external resources that must be setup for each enterprise application on the target data processing system, configuration information specifying a manipulation of application server configurations, and prerequisite information specifying at least one of required external programs, a version of required external programs, and a service level of required external programs;

selecting a subset of enterprise applications stored in the dynamic distribution directory for deployment based on at least two identifying indicia selected from the group consisting of stage information, target information, settings information, resource information, configuration information, and prerequisite information in each enterprise application of the subset of enterprise applications stored in the dynamic distribution directory, wherein at least one of the identifying indicia used in said selecting of the subset of enterprise applications is selected from a group consisting of resource information and prerequisite information in each enterprise application;

identifying target data processing systems by reading target information for each of the selected subset of enterprise applications;

pre-validating each target data processing system before deploying the subset of enterprise applications, wherein pre-validating involves checking whether deployment to each target data processing system has an acceptable chance of success;

reading the settings information for each of the selected subset of enterprise applications upon determining at least one of the target data processing systems has the acceptable chance of success;

installing the selected subset of enterprise applications into a distribution repository with updated target information based on the pre validation and reading the settings information; and deploying the selected subset of enterprise applications onto each of the corresponding pre-validated target data processing systems.

3. The computer readable storage medium of claim 2, wherein the stage information further specifies where each enterprise application should be deployed, including specifying a certain an operating system, specifying a particular application version, specifying a particular subset of data processing systems within a set of data processing systems, specifying a corporate department owning a subset of data processing systems, and specifying a physical location of a subset of data processing systems within a set of data processing systems.

4. The computer readable storage medium of claim 2, wherein the settings information comprises information selected from the group consisting of: information specifying which external resources on a data processing system are configured when deploying each enterprise application;

information specifying which external prerequisites are required before deploying each enterprise application;

information specifying which applications are required before deploying each enterprise application;

information specifying which version of an application is required before deploying each enterprise application; and combinations thereof.

5. The computer readable storage medium of claim 2, wherein: the settings information comprises information specifying configuration settings for a corresponding enterprise application.

6. A data processing system: comprising:
a bus; a memory operably connected to the bus; a processor unit operably connected to the bus;
a computer program product in the memory for deploying enterprise applications, the computer program product comprising:
a non-transitory computer readable storage medium having computer readable program code embodied therein, the computer readable program code, when executed on a computer, causes the computer to perform:
storing a plurality of enterprise application in a dynamic distribution directory with at least one data record containing identifying indicia about each enterprise application, the identifying indicia including stage information specifying a particular time when the each enterprise application should be deployed, target information specifying which data processing systems should receive each enterprise application, which data processing systems should be affected during deployment, and also an expected response from a target data processing system, settings information specifying how to configure each enterprise application on the target data processing system, resource information specifying information regarding external resources that must be setup for each enterprise application on the target data processing system, configuration information specifying a manipulation of application server configurations, and prerequisite information specifying at least one of required external programs, a version of required external programs, and a service level of required external programs;
selecting a subset of enterprise applications stored in the dynamic distribution directory for deployment based on at least two identifying indicia selected from the group consisting of stage information, target information, settings information, resource information, configuration information, and prerequisite information in each enterprise application of the subset of enterprise applications stored in the dynamic distribution directory, wherein at least one of the identifying indicia used in said selecting of the subset of enterprise applications is selected from a group consisting of resource information and prerequisite information in each enterprise application;
identifying target data processing systems by reading target information for each of the selected subset of enterprise applications;
pre-validating each target data processing system before deploying the subset of enterprise applications, wherein pre-validating involves checking whether deployment to each target data processing system has an acceptable chance of success;
reading the settings information for each of the selected subset of enterprise applications upon determining at least one of the target data processing systems has the acceptable chance of success;

installing the selected subset of enterprise applications into a distribution repository with updated target information based on the pre-validation and reading of the settings information; and
deploying the selected subset of enterprise applications onto each of the corresponding pre-validated target data processing systems.

7. The data processing system of claim 6, wherein the stage information further specifies where each enterprise application should be deployed, including specifying a certain an operating system, specifying a particular application version, specifying a particular subset of data processing systems within a set of data processing systems, specifying a corporate department owning a subset of data processing systems, and specifying a physical location of a subset of data processing systems within a set of data processing systems.

8. The data processing system of claim 6, wherein the settings information comprises information selected from the group consisting of:
information specifying which external resources on a data processing system are configured when deploying each enterprise application;
information specifying which external prerequisites are required before deploying each enterprise application;
information specifying which applications are required before deploying each enterprise application;
information specifying which version of an application is required before deploying each enterprise application; and
combinations thereof.

9. The data processing system of claim 6, wherein:
the settings information comprises information specifying configuration settings for a corresponding enterprise application.

10. The method of claim 1, wherein pre-validating involves checking whether deployment to each target data processing system has the acceptable chance of success comprises at least one of checking whether each target data processing system exists, validating contents of each of the selected subset of enterprise applications, validating whether a deployment action is preformed, and determining whether a set of pre-defined prerequisites are met.

11. The computer readable storage medium of claim 2, wherein the computer readable program code for pre-validating involves checking whether deployment to each target data processing system has the acceptable chance of success comprises computer readable program code for at least one of checking whether each target data processing system exists, validating contents of each of the selected subset of enterprise applications, validating whether a deployment action is preformed, and determining whether a set of pre-defined prerequisites are met.

12. The data processing system of claim 6, wherein the computer readable program code for pre-validating involves checking whether deployment to each target data processing system has the acceptable chance of success comprises computer readable program code for at least one of checking whether each target data processing system exists, validating contents of each of the selected subset of enterprise applications, validating whether a deployment action is preformed, and determining whether a set of pre-defined prerequisites are met.

* * * * *